(12) United States Patent
Häberle et al.

(10) Patent No.: US 11,739,672 B2
(45) Date of Patent: Aug. 29, 2023

(54) EXHAUST GAS HEATER (71) Applicant: Purem GmbH, Neunkirchen (DE)

(72) Inventors: Jürgen Häberle, Stuttgart (DE); Amol Anil Karekar, Esslingen (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 18/065,693

(22) Filed: Dec. 14, 2022

(65) Prior Publication Data
US 2023/0184150 A1 Jun. 15, 2023

(30) Foreign Application Priority Data

Dec. 14, 2021 (DE) .................... 10 2021 132 932.9

(51) Int. Cl.
*F01N 3/20* (2006.01)
*H05B 3/26* (2006.01)
(52) U.S. Cl.
CPC ............ *F01N 3/2013* (2013.01); *H05B 3/265* (2013.01); *F01N 2240/16* (2013.01); *H05B 2203/022* (2013.01)
(58) Field of Classification Search
CPC ... F01N 3/2013; F01N 2240/16; H05B 3/265; H05B 2203/022
See application file for complete search history.

(56) References Cited

U.S. PATENT DOCUMENTS

2022/0186647 A1\* 6/2022 Saurat .................. F01N 3/2803

FOREIGN PATENT DOCUMENTS

DE 20 2021 102 620 U1 7/2021
DE 10 2021 109 568 A1 9/2022

\* cited by examiner

*Primary Examiner* — Brandon D Lee
(74) *Attorney, Agent, or Firm* — Walter Ottesen, P.A.

(57) ABSTRACT

An exhaust gas heater for an exhaust system of an internal combustion engine includes a carrier arrangement and a heating conductor arrangement supported on the carrier arrangement. The heating conductor arrangement has at least one heating conductor wherethrough current flows. The at least one heating conductor is supported with respect to the carrier arrangement by at least one connecting element. At least one length compensation arrangement has a first length compensation element, which has a first supporting surface providing a wedge formation, and has a second length compensation element, which has a second supporting surface supported on the first supporting surface and provides a counter-wedge formation. The length compensation arrangement is provided in association with the at least one connecting element. The first length compensation element and the second length compensation element have materially different coefficients of thermal expansion.

16 Claims, 6 Drawing Sheets

EXHAUST GAS HEATER

CROSS REFERENCE TO RELATED APPLICATION

This application claims priority of German patent application no. 10 2021 132 932.9, filed Dec. 14, 2021, the entire content of which is incorporated herein by reference.

TECHNICAL FIELD

The present disclosure relates to an exhaust gas heater, by means of which heat can be transferred in an exhaust system of a motor vehicle to the exhaust gas emitted by an internal combustion engine and flowing therein, in order thereby to bring system regions, such as catalytic converters or particle filters, arranged downstream with respect to the exhaust gas heater, to operating temperature more quickly, particularly in a starting phase of operation of an internal combustion engine.

BACKGROUND

German Patent Application DE 10 2021 109 568, which is a post-publication, discloses an exhaust gas heater in which, between two substantially plate-type carrier elements of a carrier arrangement constructed from sheet metal material, two heating conductors of a heating conductor arrangement, which are provided by cutting out from a flat material and are of substantially plate-type or sheet-like configuration, are arranged in succession in an exhaust gas main flow direction. The layered construction of carrier elements and heating conductors arranged between them is held together by a plurality of connecting elements of bolt-type configuration. In order to achieve electrical insulation of the heating conductors with respect to the carrier elements and also with respect to one another, a plurality of supporting elements made of electrically insulating material, for example ceramic material, are arranged between them.

SUMMARY

It is an object of the present disclosure to provide an exhaust gas heater in which an assembly of the components of the exhaust gas heater which is stable irrespective of the temperature of the exhaust gas heater is ensured.

According to the disclosure, this object is, for example, achieved by an exhaust gas heater for an exhaust system of an internal combustion engine. The exhaust gas heater includes a carrier arrangement and a heating conductor arrangement supported on the carrier arrangement and having at least one heating conductor, through which current flows, wherein the at least one heating conductor is supported with respect to the carrier arrangement by at least one connecting element, which is elongate in the direction of a connecting element longitudinal axis, wherein at least one length compensation arrangement having a first length compensation element, which has a first supporting surface providing a wedge formation, and a second length compensation element, which has a second supporting surface supported on the first supporting surface and providing a counter-wedge formation, is provided in association with at least one connecting element, wherein the first length compensation element and the second length compensation element have different coefficients of thermal expansion than one another.

When the exhaust gas heater is heated, the mutually abutting supporting surfaces on the two length compensation elements, which are constructed with materials with different coefficients of thermal expansion, and the wedge effect generated by the interaction of the two supporting surfaces, ensure that the length compensation element which is configured with a lower coefficient of thermal expansion expands to a lesser extent than the other length compensation element but is displaced or acted upon in the direction of the connecting element longitudinal axis by this other length compensation element. As a result, in particular an expansion of the associated connecting element in the direction of its longitudinal axis which occurs during heating is compensated for, and it is thus possible to ensure that the heating conductor arrangement is firmly held together with the carrier arrangement even when the temperature increases.

In order to avoid an electrical short circuit, it is proposed that the at least one heating conductor is supported in an electrically insulated manner with respect to the carrier arrangement by means of at least one carrier arrangement supporting unit.

For a construction which is stable even under severe thermal and mechanical loading, the carrier arrangement can include two carrier elements accommodating the heating conductor arrangement between them in the direction of an exhaust gas heater longitudinal axis, and the heating conductor arrangement can be supported in an electrically insulated manner with respect to each carrier element by means of at least one carrier arrangement supporting unit.

In a construction which can be implemented simply and with a small number of components and is therefore also, in particular, very compact, at least one carrier arrangement supporting unit can provide a length compensation arrangement.

Length compensation, particularly in the case of thermally induced expansion of a connecting element, can also be achieved in that at least one, preferably each, connecting element is supported with respect to the carrier arrangement in the direction of the connecting element longitudinal axis by means of at least one length compensation arrangement.

To obtain a defined wedge interaction between the length compensation elements of a length compensation arrangement, it is possible, in the case of at least one, preferably each, length compensation arrangement, for the first length compensation element to have a first connecting element penetration opening which is at least partially surrounded by the first supporting surface, or/and for the second length compensation element to have a second connecting element penetration opening which is at least partially surrounded by the second supporting surface.

In the case of at least one, preferably each, length compensation arrangement, the first supporting surface or/and the second supporting surface can be of frustoconical configuration.

In order to be able to make particularly efficient use of the wedge effect provided by the length compensation elements, it is proposed that that supporting surface of the first supporting surface and the second supporting surface which is assigned to the length compensation element having a lower coefficient of thermal expansion is oriented toward the connecting element, and that that supporting surface of the first supporting surface and the second supporting surface which is assigned to the length compensation element having a higher coefficient of thermal expansion is oriented away from the connecting element.

Particularly where the supporting surfaces are embodied as frustoconical surfaces, it is possible for this purpose to provide for that supporting surface of the first supporting surface and the second supporting surface which is assigned to the length compensation element having a lower coefficient of thermal expansion to be an inner frustoconical surface, and for that supporting surface of the first supporting surface and the second supporting surface which is assigned to the length compensation element having a higher coefficient of thermal expansion to be an outer frustoconical surface.

For a construction which can be implemented at low cost but is stable and resistant to the influence of exhaust gas, it is proposed that, in at least one, preferably each, length compensation arrangement, at least one length compensation element of the first length compensation element and the second length compensation element is constructed with metal material.

Particularly if the heating conductor arrangement is to be supported in an electrically insulated manner with respect to the carrier arrangement by means of a length compensation arrangement, it is advantageous if, in the case of at least one, preferably each, length compensation arrangement, at least one length compensation element of the first length compensation element and the second length compensation element is constructed with electrically insulating material, preferably ceramic material.

For support with respect to the heating conductor arrangement or the carrier arrangement, it is possible, in the case of at least one, preferably each, length compensation arrangement, for the first length compensation element to have a third supporting surface, which is substantially orthogonal to the connecting element longitudinal axis, or/and for the second length compensation element to have a fourth supporting surface, which is substantially orthogonal to the connecting element longitudinal axis.

At least one, preferably each, connecting element can include a screw bolt, which has a head and an externally threaded shank, as well as a nut, which is in threaded engagement with the externally threaded shank. In order to support such a connecting element with respect to the carrier arrangement, provision can then also be made, in the case of at least one, preferably each, connecting element, for the head or/and the nut to be supported with respect to the carrier arrangement by means of a length compensation arrangement.

A compact construction can be promoted if at least one, preferably each, connecting element includes a connecting bolt, which is connected materially to the carrier arrangement in at least one, preferably each, axial end region.

The disclosure furthermore relates to an exhaust system for an internal combustion engine having at least one exhaust gas heater constructed according to the disclosure.

BRIEF DESCRIPTION OF THE DRAWINGS

The invention will now be described with reference to the drawings wherein.

DESCRIPTION OF THE PREFERRED EMBODIMENTS

Figure 1:
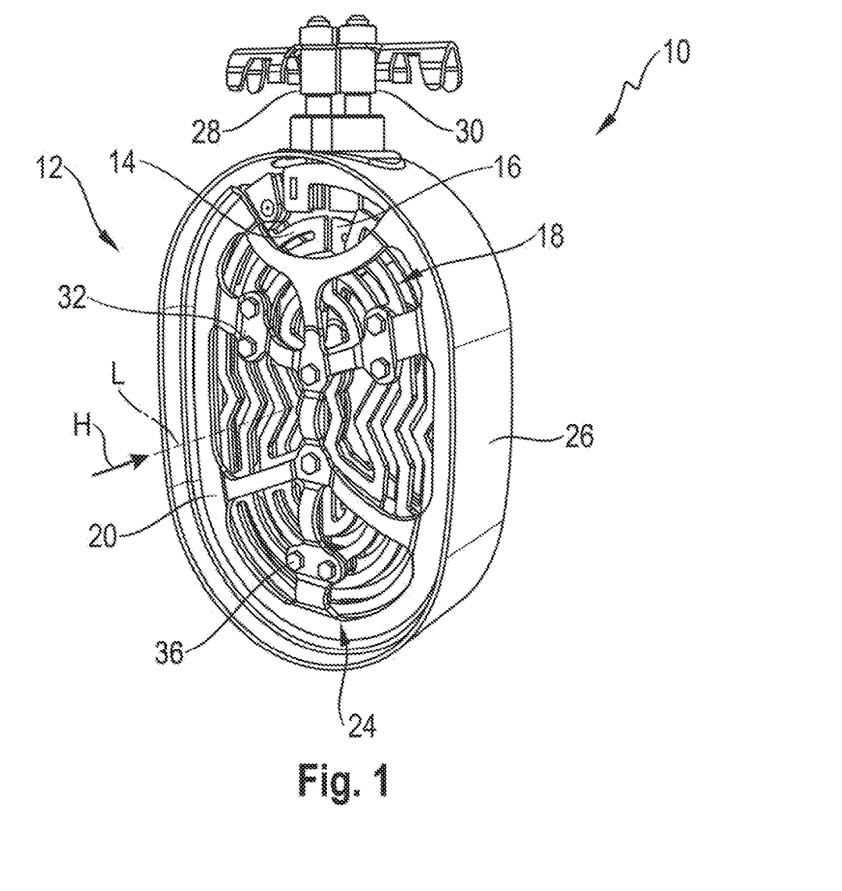
FIG. 1 shows a perspective view of an exhaust gas heater.
Figure 2:
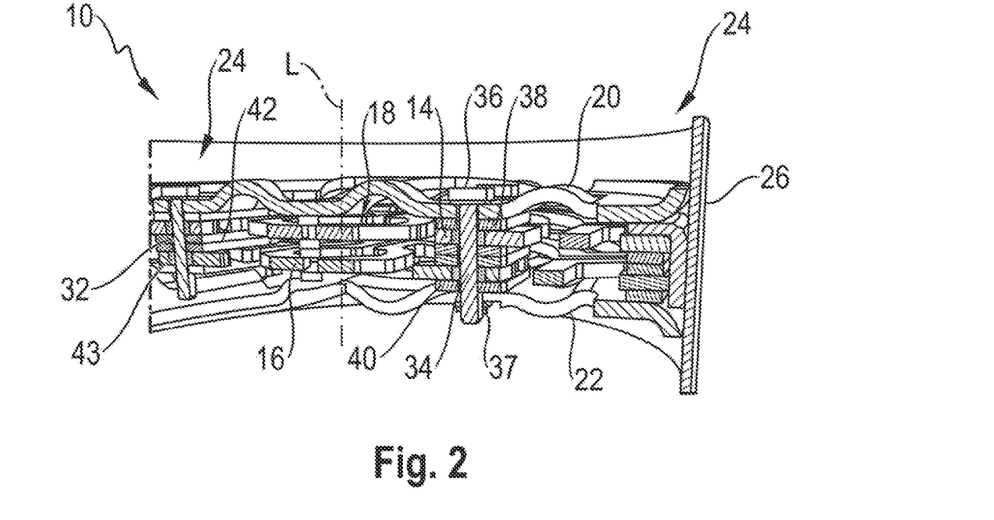
FIG. 2 shows a longitudinal sectional view of the exhaust gas heater of FIG. 1.

FIGS. 1 and 2 show an exhaust gas heater 10 for an exhaust system 12 of an internal combustion engine, for example on a motor vehicle. In the exhaust system 12, exhaust gas can flow through the exhaust gas heater 10 in an exhaust gas main flow direction H, and the exhaust gas heater has two heating conductors 14, 16 of a heating conductor arrangement, denoted overall by 18, which are arranged in series in the direction of an exhaust gas heater longitudinal axis L and can thus be flowed around one after the other by exhaust gas flowing substantially in the exhaust gas main flow direction H. The heating conductors 14, 16 are of substantially plate-type construction or are constructed from flat material and can be produced with their structure, which is provided with a plurality of sections extending in a meander-type structure, by cutting out from a flat material blank, in particular a metal blank.

On the sides of the two heating conductors 14, 16 which face away from one another in the exhaust gas heater longitudinal direction L, carrier elements 20, 22 of a carrier arrangement, denoted overall by 24, are provided which are of substantially plate-type configuration. In their outer circumferential region, the plate-type carrier elements 20, 22 are fixed on a substantially cylindrical carrier housing 26.

The two heating conductors 14, 16 can be connected in series or in parallel with one another. For electrical connection to a voltage source, two connection units 28, 30 are provided, which pass through the carrier housing 26 and are electrically conductively connected to the heating conductors 14, 16 in the interior space surrounded by the carrier housing 26.

In order to obtain a stable assembly, the two carrier elements 20, 22 and the mutually directly adjacent heating conductors 14, 16 arranged between them are firmly connected to one another by a plurality of bolt-type connecting elements 32. The connecting elements 32 can be configured, for example, as screw bolts with an externally threaded shank 34 and a head 36. A nut 37 is screwed onto the externally threaded shank 34 in order to clamp the layered structure including the carrier elements 20, 22 and the heating conductors 14, 16. The connecting elements 32 can be constructed using steel material or a nickel-chromium alloy, for example.

In order to achieve electrical insulation of the heating conductors 14, 16 with respect to the carrier elements 20, 22 of the carrier arrangement 24, which are generally constructed of metal material, a carrier arrangement supporting unit 38, which is constructed with electrically insulating material, for example ceramic material, is provided between the heating conductor element 14 and the carrier element 20, for example in association with each connecting element 32, the supporting unit being of substantially plate-type or annular disk-type configuration and being penetrated by the associated connecting element 32 in the region of an opening provided therein. A carrier arrangement supporting unit 40 arranged between the heating conductor 16 and the carrier element 22 is likewise provided, for example in association with each connecting element 32. The carrier arrangement supporting units 38, 40 can be of substantially identical construction, for example.

In order to support the two mutually adjacent heating conductors 14, 16 in an electrically insulated manner with respect to one another, a heating conductor supporting unit 42 is provided, for example, in association with each connecting element 32. Each heating conductor supporting unit 42 is also of substantially plate-type configuration with one or more disks and is constructed using ceramic material.

With reference to FIGS. 3 to 11, various embodiments of exhaust gas heaters are described below, in particular with regard to the firm connection of the carrier arrangement 24 or the carrier elements 20, 22 thereof to the heating conductor arrangement 18 or the heating conductors 14, 16 thereof by connecting elements 32 which hold these components together. Each of FIGS. 3 to 11 illustrates the region of a heating conductor in which a connecting element 32 is positioned or passes through associated openings in the carrier elements 20, 22 or the heating conductors 14, 16. On account of the simple structural configuration, it is advantageous if, in each exhaust gas heater, all the regions in which a firm connection of the carrier elements 20, 22 to the heating conductors 14, 16 is implemented by means of a respective connecting element 32 are of identical configuration. In principle, however, various embodiments could be provided in such regions to furnish the firm connection.

Figure 3:
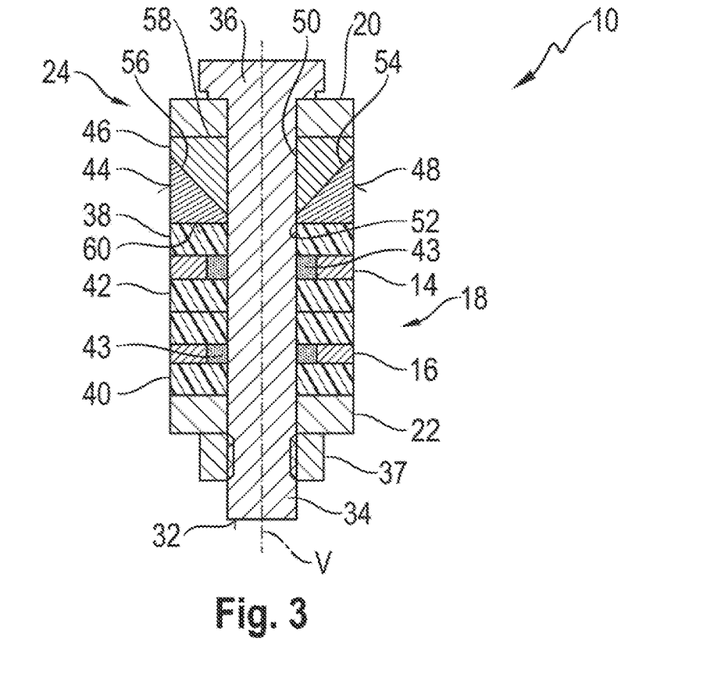
FIG. 3 shows a longitudinal section of an exhaust gas heater with carrier arrangement supporting units arranged in association with a connecting element and with a length compensation arrangement in a schematic illustration.

FIG. 3 shows, in principle, the region of the connection of the two carrier elements 20, 22 and the heating conductors 14, 16 arranged between them by means of a connecting element 32 for an embodiment of an exhaust gas heater 10 according to the disclosure. The heating conductor supporting unit 42 can be seen between the two heating conductors 14, 16. Where the heating conductors 14, 16 are penetrated by the connecting element 32, sleeve-type insulating elements 43 can be inserted into the openings formed in the heating conductors 14, 16 in order to achieve defined positioning of the connecting element 32 in the openings provided in the heating conductors 14, 16.

A length compensation arrangement, denoted overall by 44, is arranged between the carrier element 20 of the carrier arrangement 24 and the carrier arrangement supporting unit 38. The length compensation arrangement 44 associated with the illustrated connecting element 32 includes two length compensation elements 46, 48, which each have a connecting element penetration opening 50, 52, through which the externally threaded shank 34 of the connecting element 32 passes. The first length compensation element 46 is formed with a frustoconical first supporting surface 54, which provides an outer frustoconical surface. The second length compensating element 48 is formed with a frustoconical second supporting surface 56, which provides an inner frustoconical surface and has the same cone angle as the first supporting surface 54 and is supported on the latter. The first supporting surface 54 provides a wedge formation, which interacts with the second supporting surface 56, which provides a counter-wedge formation.

The two length compensation elements 46, 48 are constructed with materials that have different coefficients of thermal expansion or coefficients of longitudinal expansion.

In an embodiment, the construction material of the first length compensation element 46 has a higher, advantageously a significantly higher, coefficient of thermal expansion than the construction material of the second length compensation element 48.

In the embodiment illustrated in FIG. 3, the first length compensation element 46 is supported on the carrier element 20 by a third supporting surface 58, which is substantially orthogonal to the connecting element longitudinal axis V. The second length compensation element 48 is supported by a fourth supporting surface 60, which is substantially orthogonal to the connecting element longitudinal axis V, on the carrier arrangement supporting unit 38 constructed with electrically insulating material. Since the length compensation arrangement 44 is thus supported in an electrically insulated manner with respect to the heating conductor arrangement 18, in particular with respect to the heating conductor 14, by the associated carrier arrangement supporting unit 38, the length compensation elements 46, 48 do not necessarily have to be constructed with electrically insulating material. Each of the length compensation elements 46, 48 can be constructed with metal material, for example, wherein these construction materials should be selected in such a way that the condition is satisfied that the construction material of the first length compensation element 46 has a higher, in particular a significantly higher, coefficient of thermal expansion than the construction material of the second length compensation element 48. In principle, however, at least one of the two length compensation elements 46, 48 could also be constructed with electrically insulating material, for example ceramic material, it likewise being necessary to satisfy the condition that the construction material of one of the two length compensation elements 46, 48, preferably the construction material of the first length compensation element 46, has a higher, preferably a significantly higher, coefficient of thermal expansion than the construction material of the respective other length compensation element.

During operation of an exhaust gas heater 10 of this type, its temperature may rise to values of more than 900° C. This can lead to a relatively pronounced thermal expansion of various components, in particular of the connecting element 32. An excessive thermally induced increase in length of the externally threaded shank 34 could lead to the loss of the firm clamping of the components to be held together by the connecting element 32. However, such a thermally induced longitudinal expansion of the connecting element 32 is compensated for by the length compensation arrangement 44 in that the length compensation element, which expands to a relatively large extent under the action of heat, in particular the first length compensation element 46, which is configured with a higher coefficient of thermal expansion, expands to an equal extent in the direction of the connecting element longitudinal axis V and, as a result of the wedge effect, acts on or displaces the other length compensation element, that is, for example, the second length compensation element 48, which has a lower coefficient of thermal expansion, in the direction of the connecting element longitudinal axis V. This compensates for a longitudinal expansion of the connecting element 32 or of the externally threaded shank 34 thereof and ensures that the components clamped between the head 36 and the nut 37 continue to be held firmly together. For this purpose, it is advantageous, in particular, if the length compensation element which is configured with a smaller overall axial length than the externally threaded shank 34 and has a higher coefficient of thermal expansion has a coefficient of thermal expansion which is higher, in particular significantly higher, than the coefficient of thermal expansion of the construction material of the connecting element 32 or of the externally threaded shank 34 thereof. The coefficient of thermal expansion of the length compensation element with the lower coefficient of thermal expansion can be smaller than the coefficient of thermal expansion of the connecting element 32, for example.

Figure 4:
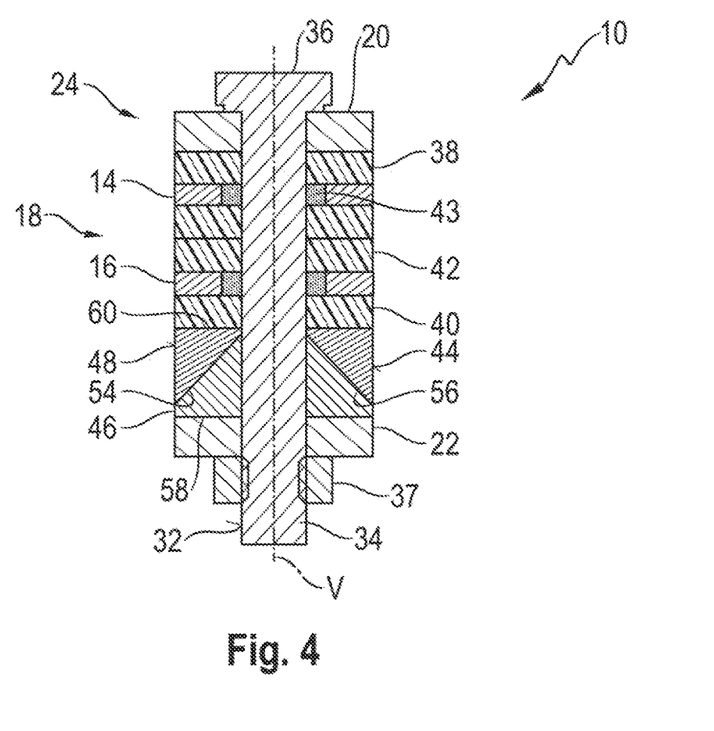
FIG. 4 shows an illustration corresponding to FIG. 3 of an alternative embodiment.

A modified embodiment is illustrated in FIG. 4. In the embodiment illustrated in FIG. 4, the length compensation arrangement 44 is also arranged between the two carrier elements 20, 22 of the carrier arrangement 24 but is situated between the carrier element 22 and the carrier arrangement supporting unit 40, which provides electrical insulation with respect to the heating conductor 16. The mode of operation corresponds to the mode of operation described above with reference to FIG. 3.

With reference to FIGS. 3 and 4, it should be pointed out that, irrespective of the position at which the length compensation arrangement 44 constructed with the two length compensation elements 46, 48 is provided, this could also be installed in such a way that the second length compensation element 48 is supported by its fourth supporting surface 60 on one of the two carrier elements 20, 22, while the first length compensation element 46 is supported by its third supporting surface 58 on one of the two carrier arrangement supporting units 38, 40.

Figure 5:
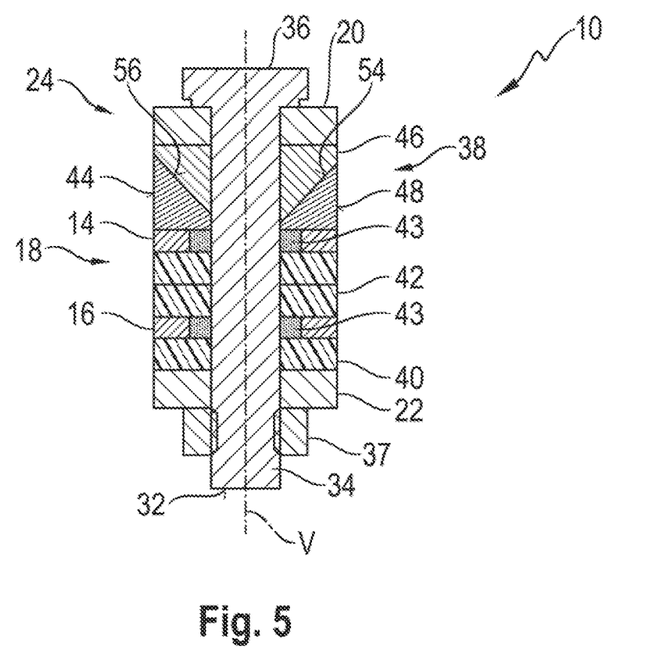
FIG. 5 shows a further illustration corresponding to FIG. 3 of an alternative embodiment.

FIG. 5 shows an embodiment in which one of the two carrier arrangement supporting units 38, 40, in particular carrier arrangement supporting unit 38, is provided by the length compensation arrangement 44. The second length compensation element 48 is supported by its fourth supporting surface 60 directly on the heating conductor 14, while, as in the embodiment of FIG. 3, the first length compensation element 46 is supported by its third supporting surface 58 on the carrier element 20 of the carrier arrangement 24. Since the carrier element 20 is generally constructed with sheet metal material and is thus electrically conductive, the function of electrically insulating the heating conductor arrangement 18, in particular the heating conductor 14, with respect to the carrier element 20 must in this embodiment also be performed by the length compensation arrangement 44. For this purpose, at least one of the length compensation elements 46, 48 must be constructed with electrically insulating material. Advantageously, the second length compensation element 48 is constructed with ceramic material, for example, while there is likewise a need to satisfy the above-described condition that the two length compensation elements 46, 48 have coefficients of thermal expansion which are different from one another, preferably significantly different from one another.

In the embodiment illustrated in FIG. 5, the length compensation arrangement 44 could also be arranged in the region between the heating conductor 16 and the carrier element 22, and in this embodiment, too, the length compensation arrangement 44 could be installed inverted, so that the first length compensation element 46, which provides an outer frustoconical surface, is supported by its third supporting surface 58 on one of the heating conductors 14, 16, while the second length compensation element 48 is then supported by its fourth supporting surface 60 on the immediately adjacent carrier element 20 or 22.

Figure 6:
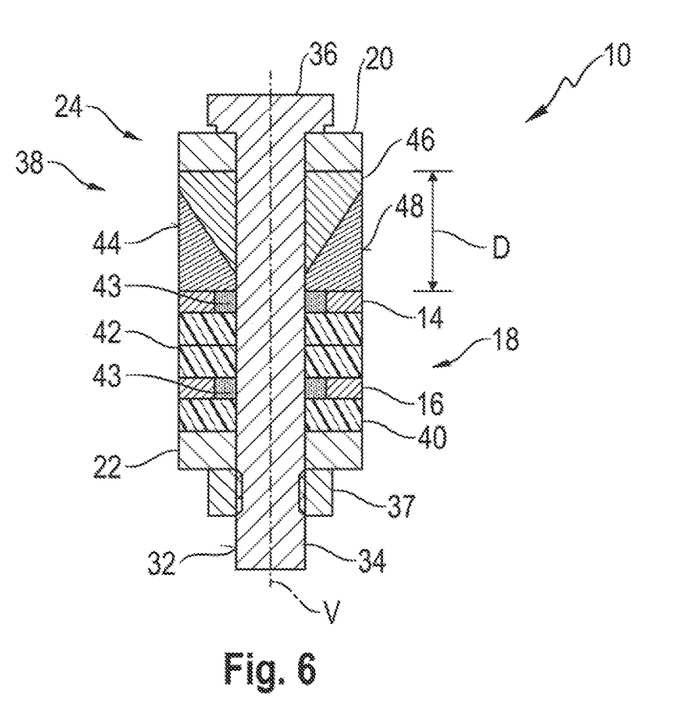
FIG. 6 shows a further illustration corresponding to FIG. 3 of an alternative embodiment.

FIG. 6 illustrates by way of example, with reference to the variant embodiment shown in principle in FIG. 4, that the overall length D of the length compensation arrangement 44 can be varied in order to provide the required length compensation function. It can be seen that this embodiment illustrated in FIG. 6 has a significantly greater extent in the direction of the connecting element longitudinal axis V, which can be in the region of 6 mm, for example.

Figure 7:
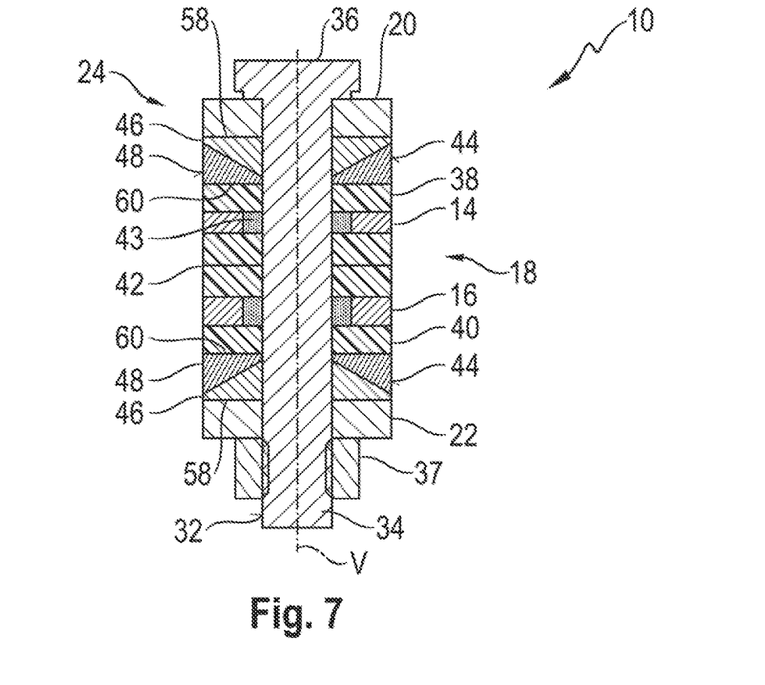
FIG. 7 shows an illustration corresponding to FIG. 3 of an alternative embodiment.

FIG. 7 shows an embodiment of an exhaust gas heater 10 that combines the embodiments of FIGS. 3 and 4. A length compensation arrangement 44 having a first length compensation element 46 and a second length compensation element 48 is provided both in association with carrier element 20 and in association with carrier element 22. This enables symmetrical clamping of the heating conductors 14, 16 between the two carrier elements 20, 22 and division of the length compensation function into two spaced-apart axial regions.

In the variant embodiment illustrated in FIG. 7 too, at least one of the two length compensation arrangements 44 could be installed in such a way that the respective first length compensation element 46 is supported with respect to the respectively adjacent carrier arrangement supporting unit 38 or 40, while the respective second length compensation element 48 is supported with respect to the respectively adjacent carrier element 20 or 22.

Figure 8:
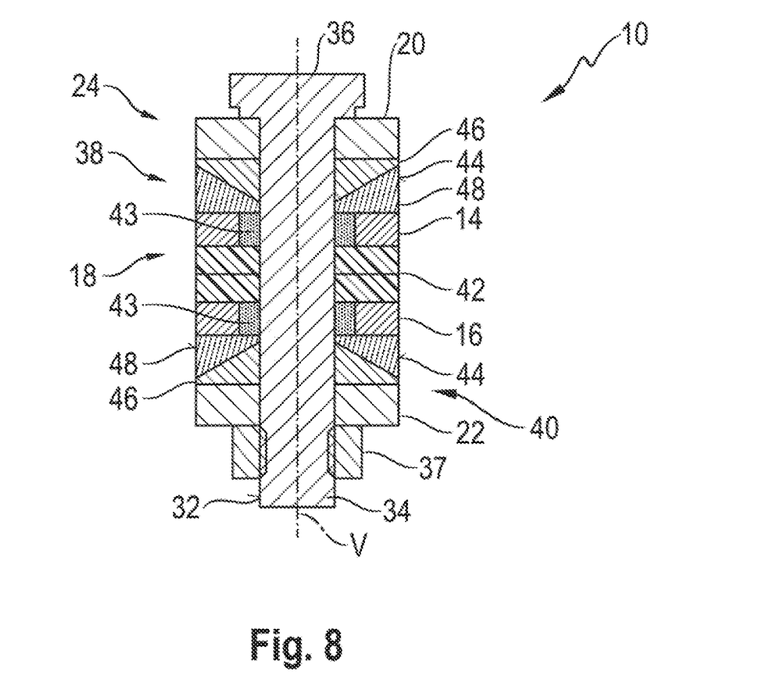
FIG. 8 shows a further illustration corresponding to FIG. 3 of an alternative embodiment.

FIG. 8 shows a variant embodiment of an exhaust gas heater 10 in which, based on the configuration principle of FIG. 5, each of the carrier arrangement supporting units 38, 40 is provided by a length compensation arrangement 44. Between each of the two heating conductors 14, 16 and the respectively adjacent carrier element 20, 22 there is a length compensation arrangement 44, wherein here too the embodiment can be such that the respective second length compensation element 48 constructed with electrically insulating material rests against the heating conductor 14 or 16, while the respective first length compensation element 46 is supported on the directly adjacent supporting element 20 or 22. Here too, a reverse installation situation could be selected in which, in the case of at least one of the length compensation arrangements 44, the second length compensation element 48 is supported on the respectively associated carrier element 20 or 22.

Figure 9:
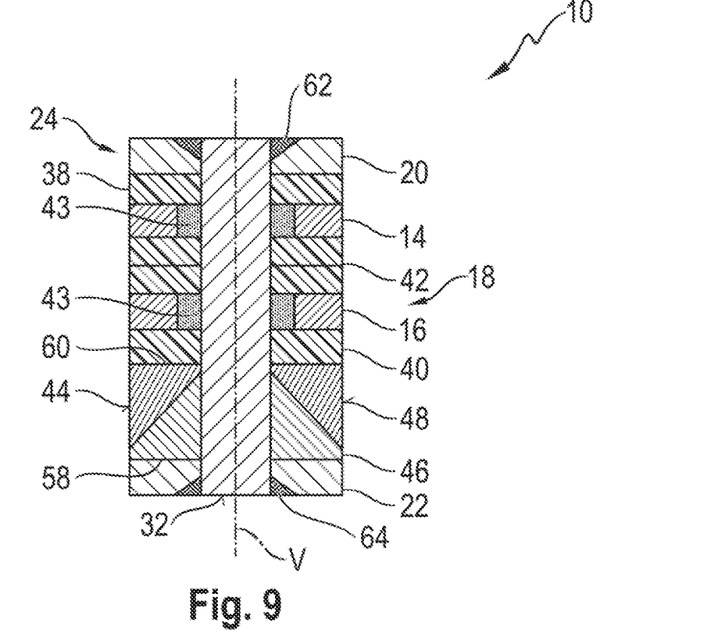
FIG. 9 shows a further illustration corresponding to FIG. 3 of an alternative embodiment.

FIG. 9 shows an embodiment of a heating conductor in which the or each connecting element 32 is configured as a connecting bolt which, in its two axial end regions, essentially does not project beyond the carrier elements 20, 22 of the carrier arrangement 24. The connecting element 32 is inserted into respective openings of the carrier elements 20, 22 and is firmly connected to the carrier elements 20, 22 by a weld seam 62, 64, for example, a circumferential weld seam.

A length compensation arrangement 44 of the above-described construction is arranged in the support path between the carrier arrangement supporting unit 40 and the carrier element 20. Alternatively or additionally, such a length compensation arrangement 44 could also be positioned in the support path between the carrier element 20 and the carrier arrangement supporting unit 38. Here too, the embodiment could be such that, in the case of one or, if appropriate, both length compensation arrangements 44, the respective second length compensation element 48 is supported on the carrier element 20 or 22.

Figure 10:
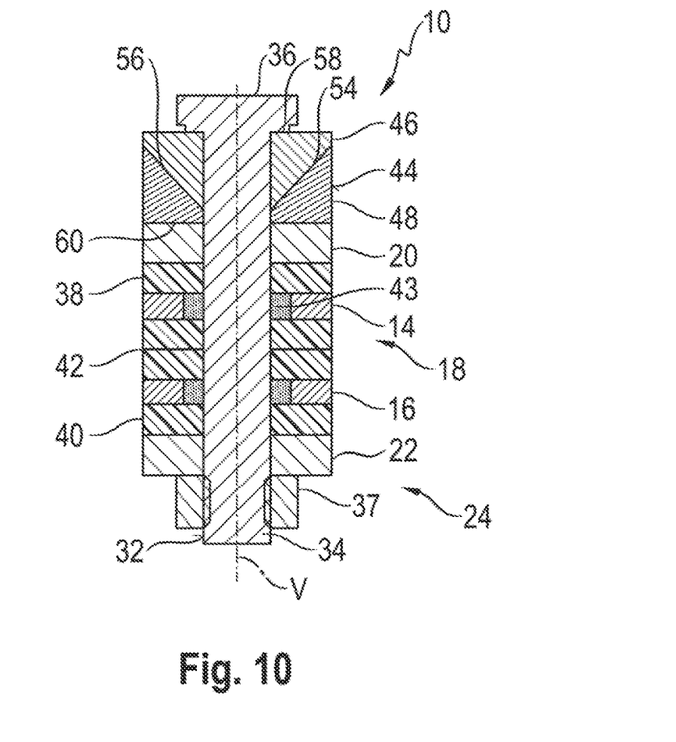
FIG. 10 shows a further illustration corresponding to FIG. 3 of an alternative embodiment; and, FIG. 11 shows a further illustration corresponding to FIG. 3 of an alternative embodiment.

FIG. 10 shows an embodiment of an exhaust gas heater in which a length compensation arrangement 44 is not positioned in the support path between the two carrier elements 20, 22 of the carrier arrangement 24 but in the support path between one of the carrier elements 20, 22, in particular carrier element 20, and the connecting element 32, in particular the head 36 of the latter. The second length compensation element 48 is supported by its fourth supporting surface 60 on the carrier element 20, while the head 36 of the connecting element 32 is supported on the third supporting surface 58 of the first length compensation element 46.

In this embodiment too, provision can be made for the first length compensation element 46, which provides an outer frustoconical surface with its first supporting surface 54, to have a higher, preferably a significantly higher, coefficient of thermal expansion than the second length compensation element 48, which provides an inner frustoconical surface with its second supporting surface 56.

Figure 11:
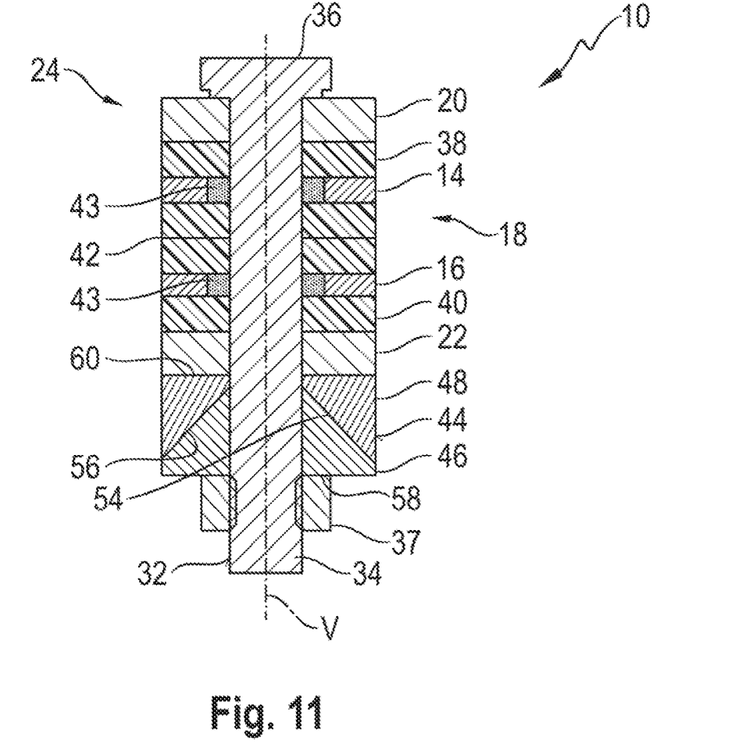

In the embodiment of an exhaust gas heater 10 illustrated in FIG. 11, the length compensation arrangement 44 is positioned in the support path between the carrier element 22 and the nut 37, with the result that the first length compensation element 46 is supported by its third supporting surface 54 with respect to the nut 37, and the second length compensation element 48 is supported by its fourth supporting surface 60 on the carrier element 22.

In the embodiments illustrated in FIGS. 10 and 11 too, the construction materials of the two length compensation elements 46, 48 are matched to one another in such a way that one of the two length compensation elements 46, 48, preferably the first length compensation element 46, which provides the first supporting surface 54, which is configured as an outer frustoconical surface, has a higher, preferably a significantly higher, coefficient of thermal expansion than the other of the two length compensation elements 46, 48.

In the case of the variant embodiments illustrated in FIGS. 10 and 11 too, the construction could, in principle, be such that the first length compensation element 46 is in each case supported on one of the two carrier elements 20, 22, while the second length compensation element 48 is then supported on the head 36 or the nut 37. It would also be possible for a length compensation arrangement 44 to be provided in association with each of the two carrier elements 20, 22. Since, even in the embodiments in which one or two length compensation arrangements 44 is or are positioned in the support path between the connecting element 32 and the carrier arrangement 24, the length compensation arrangement/s does/do not have to perform an electrically insulating function, it is possible, for example, for both length compensation elements 46, 48 to be constructed with electrically conductive material, for example, metal material, although it is once again necessary to pay attention to the above-described condition with regard to the coefficients of thermal expansion.

The exhaust gas heater constructed according to the disclosure ensures that a stable connection of the various components of the exhaust gas heater is achieved even in thermally and mechanically highly loaded regions of an exhaust system of an internal combustion engine, even taking into account the corrosive load occurring as a result of the exhaust gas in the exhaust system, which connection avoids a complete loss of prestress for all temperatures occurring during operation and thus ensures that the layered components of the exhaust gas heater are held together in a stable and play-free manner.

It is understood that the foregoing description is that of the preferred embodiments of the invention and that various changes and modifications may be made thereto without departing from the spirit and scope of the invention as defined in the appended claims.

What is claimed is:

1. An exhaust gas heater for an exhaust system of an internal combustion engine, the exhaust gas heater comprising:
   a carrier arrangement;
   a heating conductor arrangement supported on said carrier arrangement and having at least one heating conductor wherethrough current flows;
   at least one connecting element defining a connecting element longitudinal axis (V) and being elongated in the direction of said longitudinal axis (V);
   said at least one heating conductor being supported with respect to said carrier arrangement by said at least one connecting element;
   at least one length compensation arrangement provided in association with said at least one connecting element;
   said at least one length compensation arrangement including a first length compensation element having a first supporting surface defining a wedge formation and a second length compensation element having a second supporting surface supported on said first supporting surface and defining a counter-wedge formation; and,
   said first length compensation element and said second length compensation element having respective coefficients of thermal expansion different from one another.

2. The exhaust gas heater of claim 1, wherein said exhaust gas heater defines an exhaust gas longitudinal axis (L) and wherein at least one of the following applies:
   i) at least one carrier arrangement supporting unit supports said at least one heating conductor in an electrically insulating manner with respect to said carrier arrangement; and,
   ii) said carrier arrangement includes two carrier elements accommodating said heating conductor arrangement therebetween in the direction of said exhaust gas heater longitudinal axis (L); and, said heating conductor arrangement is supported in an electrically insulated manner with respect to each of said two carrier elements via at least one carrier arrangement supporting unit.

3. The exhaust gas heater of claim 2, wherein said at least one carrier arrangement supporting unit includes said at least one length compensation arrangement.

4. The exhaust gas heater of claim 1, wherein said at least one connecting element is supported with respect to said carrier arrangement in the direction of said connecting element longitudinal axis (V) via said at least one length compensation arrangement.

5. The exhaust gas heater of claim 1, wherein at least one of the following applies:
   i) said first length compensation element has a first connecting element penetration opening at least partially surrounded by said first supporting surface; and,
   ii) said second length compensation element has a second connecting element penetration opening at least partially surrounded by said second supporting surface.

6. The exhaust gas heater of claim 1, wherein at least one of the following applies:
   i) said first supporting surface has a frustoconical shape; and,
   ii) said second supporting surface has a frustoconical shape.

7. The exhaust gas heater of claim 1, wherein:
   the coefficient of thermal expansion of said first length compensation element is less than the coefficient of thermal expansion of said second length compensation element;
   said first supporting surface of said first length compensation element is orientated toward said at least one connecting element; and, said second supporting surface of said second length compensation element is orientated away from said at least one connecting element.

8. The exhaust gas heater of claim 6, wherein: said first supporting surface of said first length compensation element is an inner frustoconical surface; and, said second supporting surface of said second length compensation element is an outer frustoconical surface.

9. The exhaust gas heater of claim 1, wherein at least one of said first length compensation element and said second length compensation element of said at least one length compensation arrangement is constructed with metal material.

10. The exhaust gas heater of claim 1, wherein at least one length compensation element of said first length compensation element and said second length compensation element is constructed with electrically insulating material.

11. The exhaust gas heater of claim 10, wherein said electrically insulating material is ceramic.

12. The exhaust gas heater of claim 1, wherein at least one of the following applies:
 i) said first length compensation element has a third supporting surface orthogonal to said connecting element longitudinal axis (V); and,
 ii) said second length compensation element has a fourth supporting surface orthogonal to said connecting element longitudinal axis (V).

13. The exhaust gas heater of claim 1, wherein said at least one connecting element includes a threaded bolt having a head and an externally threaded shank and a nut in threaded engagement with the externally threaded shank.

14. The exhaust gas heater of claim 13, wherein at least one of said head and said nut are supported with respect to said carrier arrangement by said at least one length compensation arrangement.

15. The exhaust gas heater of claim 1, wherein said at least one connecting element comprises a connecting bolt connected materially to said carrier arrangement in at least one axial end region.

16. An exhaust system for an internal combustion engine, the exhaust system comprising:
 at least one exhaust gas heater including:
 a carrier arrangement;
 a heating conductor arrangement supported on said carrier arrangement and having at least one heating conductor wherethrough current flows;
 at least one connecting element defining a connecting element longitudinal axis (V) and being elongated in the direction of said longitudinal axis (V);
 said at least one heating conductor being supported with respect to said carrier arrangement by said at least one connecting element;
 at least one length compensation arrangement provided in association with said at least one connecting element;
 said at least one length compensation arrangement including a first length compensation element having a first supporting surface defining a wedge formation and a second length compensation element having a second supporting surface supported on said first supporting surface and defining a counter-wedge formation; and,
 said first length compensation element and said second length compensation element having respective coefficients of thermal expansion different from one another.

* * * * *